(12) United States Patent
Lopez Nieto et al.

(10) Patent No.: US 9,485,105 B2
(45) Date of Patent: Nov. 1, 2016

(54) METHOD AND TELECOMMUNICATIONS NETWORK UTILIZING MORE THAN ONE ONLINE CHARGING SYSTEM FOR A GIVEN USER

(71) Applicant: DEUTSCHE TELEKOM AG, Bonn (DE)

(72) Inventors: Ana Maria Lopez Nieto, Bonn (DE); Vikrant Chitre, Reading (GB); Gerrit Voehringer, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 202 days.

(21) Appl. No.: 14/358,234

(22) PCT Filed: Nov. 13, 2012

(86) PCT No.: PCT/EP2012/004708
§ 371 (c)(1),
(2) Date: May 15, 2014

(87) PCT Pub. No.: WO2013/072037
PCT Pub. Date: May 23, 2013

(65) Prior Publication Data
US 2015/0038111 A1    Feb. 5, 2015

(30) Foreign Application Priority Data
Nov. 15, 2011    (EP) .................................... 11009054

(51) Int. Cl.
*H04W 4/24*    (2009.01)
*H04L 12/14*    (2006.01)
*H04M 15/00*    (2006.01)

(52) U.S. Cl.
CPC .......... *H04L 12/1407* (2013.01); *H04M 15/49* (2013.01); *H04M 15/64* (2013.01); *H04M 15/66* (2013.01); *H04W 4/24* (2013.01)

(58) Field of Classification Search
CPC ................................................... H04L 12/1407
See application file for complete search history.

(56) References Cited

U.S. PATENT DOCUMENTS

| 7,958,238 B1* | 6/2011 | Batz ....................... G06Q 30/00 379/114.01 |
| 2007/0124160 A1* | 5/2007 | Duan .................... G06Q 40/025 705/38 |
| 2009/0264097 A1 | 10/2009 | Cai |
| 2010/0192207 A1* | 7/2010 | Raleigh ............ G06Q 10/06375 726/6 |

FOREIGN PATENT DOCUMENTS

| EP | 2071763 A1 | 6/2009 |
| WO | WO 03025809 A2 | 3/2003 |

* cited by examiner

*Primary Examiner* — Mazda Sabouri
(74) *Attorney, Agent, or Firm* — Leydig, Voit & Mayer, Ltd.

(57) ABSTRACT

A method for enhanced policy and charging control when a telecommunications network is used by a User Equipment corresponding to a subscriber includes a Policy and Charging Enforcement Function and a first Online Charging System, configured to communicate via an online charging interface. The telecommunications network further includes a second Online Charging System being configured to communicate via an online charging interface. The method includes: communicating, by an interworking credit control function of the telecommunications network, relative to the subscriber of the telecommunications network and with regard to the same or overlapping traffic of the subscriber via a first online charging interface with the Policy and Charging Enforcement Function, via a second online charging interface with the first Online Charging System, and via a third online charging interface with the second Online Charging System.

20 Claims, 2 Drawing Sheets

METHOD AND TELECOMMUNICATIONS NETWORK UTILIZING MORE THAN ONE ONLINE CHARGING SYSTEM FOR A GIVEN USER

CROSS-REFERENCE TO RELATED APPLICATIONS

This application is a U.S. National Phase application under 35 U.S.C. §371 of International Application No. PCT/EP2012/004708, filed on Nov. 13, 2012, and claims benefit to European Patent Application No. EP 11009054.5, filed on Nov. 15, 2011. The International Application was published in English on May 23, 2013 as WO 2013/072037 A1 under PCT Article 21(2).

FIELD

The present invention relates inter alia to a method for enhanced policy and charging control when a first telecommunications network and a second telecommunications network is used by a User Equipment, wherein the first telecommunications network comprises a first Policy and Charging Enforcement Function and a first Online Charging System, the first Policy and Charging Enforcement Function and the first Online Charging System being configured to communicate via an online charging interface.

BACKGROUND

In conventional telecommunications networks, especially mobile communication networks, policy control is applied to users based on inputs from a single credit control server. However, in certain situations it may be necessary to make decisions on policy control using inputs from multiple credit control servers.

Conventional policy and charging control (PCC) architecture, defined in 3GPP specification 23.203 defines the Policy and Charging Control functionality, which encompasses two main functions:

Flow-Based Charging, including charging control and online credit control;

Policy control (e.g. gating control, Quality of Service (QoS) control, QoS signaling, etc.).

The policy and charging control (PCC) functionality comprises the functions of the Policy and Charging Enforcement Function (PCEF), the Bearer Binding and Event Reporting Function (BBERF), the Policy and Charging Rules Function (PCRF), the Application Function (AF), the Traffic Detection Function (TDF), the Online Charging System (OCS), the Offline Charging System (OFCS) and the Subscription Profile Repository (SPR) or the User Data Repository (UDR). UDR replaces SPR when the UDC architecture as defined in TS 23.335 is applied to store PCC related subscription data. In such a deployment scenario, an Ud interface between PCRF and UDR can, e.g., be used to access subscription data in the UDR.

The Policy and Charging Rules Function (PCRF) encompasses policy control decision and flow based charging control functionalities. The PCRF provides network control regarding the service data flow detection, gating, QoS and flow based charging (except credit management) towards the Policy and Charging Enforcement Function (PCEF).

The PCEF encompasses service data flow detection, policy enforcement and flow-based charging functionalities. This functional entity is usually located at the Gateway entity (e.g. GGSN (Gateway GPRS Support Node) in the GPRS case, and PDG (Packet Data Gateway) in the WLAN case). It provides service data flow detection, user plane traffic handling, triggering control plane session management (where the IP-CAN (IP Connectivity Access Network) permits), QoS handling, and service data flow measurement as well as online and offline charging interactions.

The Online Charging System (OCS) performs the Service Data Flow Based Credit Control Function. The Online Charging System is specified in 3GPP TS 32.240.

As mentioned above, in certain situations it may be necessary to make decisions on policy control using inputs from multiple credit control servers. The situation can be further complicated if these multiple credit control servers exist in different networks. In such situations, it may not always be possible to grant direct access to policy control resources to these credit control servers due to security, compatibility or legislative reasons.

A possible solution for the case of mobile networks could be to use the usage monitoring functionality already existing on the Rel-9 3GPP Gx interface (the online policy interface used for provisioning service data flow based on charging rules and uses the diameter protocol) between a Policy and Charging Enforcement Function (PCEF), such as the GGSN (Gateway GPRS Support Node in case of a GPRS network), and the Policy and Charging Rules Function (PCRF) in conjunction with an online charging interface (especially the Gy interface) between the (Policy and Charging Enforcement Function part of the) GGSN and a charging server such as an Online Charging System (OCS). In this way the Policy and Charging Rules Function would receive the usage consumption done by the subscriber and could take policy decisions based on that usage. Several drawbacks to this alternative are the following:

It does not allow inputs from multiple charging servers,

It does not allow inputs from servers that are in a separate network than the parent operator's network.

However, this flexibility is important especially in cases of Virtual Network Operators if it is preferred to do the charging completely in the Virtual Network Operator's network space while the parent operator wishes to charge usage separately and protect its own network resources.

SUMMARY

In an embodiment, the invention provides a method for enhanced policy and charging control when a telecommunications network is used by a User Equipment corresponding to a subscriber. The telecommunications network includes a Policy and Charging Enforcement Function and a first Online Charging System. The Policy and Charging Enforcement Function and the first Online Charging System are configured to communicate via an online charging interface. The telecommunications network includes a second Online Charging System being configured to communicate via an online charging interface. The method includes: communicating, by an interworking credit control function of the telecommunications network, relative to the subscriber of the telecommunications network and with regard to the same or overlapping traffic of the subscriber, via a first online charging interface with the Policy and Charging Enforcement Function, via a second online charging interface with the first Online Charging System, and via a third online charging interface with the second Online Charging System.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
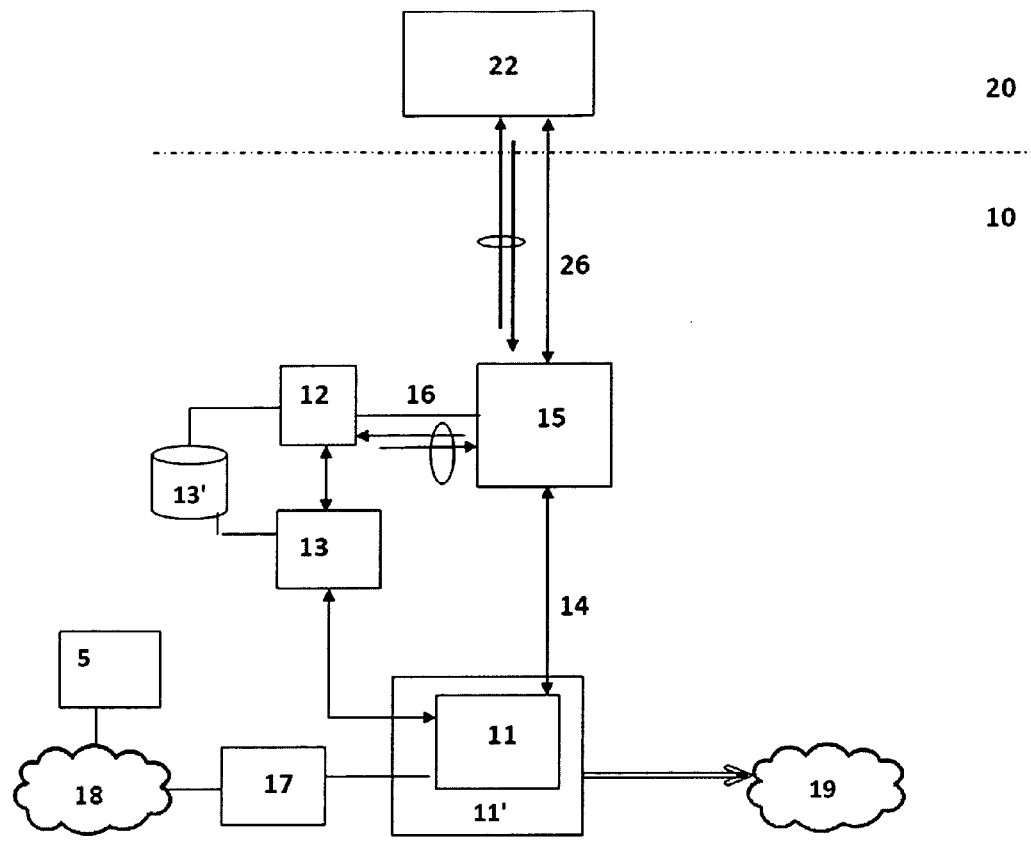
FIG. 1 schematically illustrates an example of the use of the method according to the present invention.

In an embodiment, the present invention provides a method for enhanced policy and charging control when a telecommunications network or a telecommunications network and a further telecommunications network is used by a User Equipment, wherein the method is provided such that the use of multiple credit control servers distributed in the same or different networks is possible. These credit control servers act on the same type of traffic (or overlapping types of traffic), in order to permit to apply different types of actions as result of the evaluation of those different aspects. Examples of actions can be, e.g., service authorization, quality of service control, redirection, notification, etc.

In a first alternative variant of the present invention, a method is provided for enhanced policy and charging control when a telecommunications network is used by a User Equipment, wherein the telecommunications network comprises a Policy and Charging Enforcement Function and a first Online Charging System, the Policy and Charging Enforcement Function and the first Online Charging System being configured to communicate via an online charging interface, wherein the telecommunications network comprises a second Online Charging System being configured to communicate via an online charging interface, wherein the telecommunications network further comprises an interworking credit control function, wherein the interworking credit control function communicates via a first online charging interface with the Policy and Charging Enforcement Function, via a second online charging interface with the first Online Charging System, and via a third online charging interface with the second Online Charging System. According to the first alternative of the present invention, it is especially preferred that the User Equipment corresponds to a subscriber (especially within the telecommunications network), and that the interworking credit control function communicate relative to the subscriber of the telecommunications network via the first online charging interface with the Policy and Charging Enforcement Function, via the second online charging interface with the first Online Charging System, and via the third online charging interface with the second Online Charging System.

In a second alternative variant of the present invention, a method is provided for enhanced policy and charging control when a telecommunications network and a further telecommunications network is used by a User Equipment, wherein the telecommunications network comprises a Policy and Charging Enforcement Function and a first Online Charging System, the Policy and Charging Enforcement Function and the first Online Charging System being configured to communicate via an online charging interface, wherein the further telecommunications network comprises a second Online Charging System being configured to communicate via an online charging interface, wherein the telecommunications network further comprises an interworking credit control function, wherein the interworking credit control function communicates via a first online charging interface with the Policy and Charging Enforcement Function, via a second online charging interface with the first Online Charging System, and via a third online charging interface with the second Online Charging System. According to the second alternative of the present invention, it is especially preferred that the User Equipment corresponds to a subscriber (especially within the telecommunications network and/or within the further telecommunications network), and that the interworking credit control function communicate relative to the subscriber of the telecommunications network and/or of the further telecommunications network via the first online charging interface with the Policy and Charging Enforcement Function, via the second online charging interface with the first Online Charging System, and via the third online charging interface with the second Online Charging System.

According to both alternative variants of the present invention, it is advantageously possible, that a multitude of different Online Charging Systems can be used for charging a subscriber (corresponding to the User Equipment camping on the telecommunications network and/or on the further telecommunications network), i.e. a user terminal associated with a subscriber identifier such as the Mobile Subscriber Integrated Services Digital Network Number (MSISDN), the International Mobile Subscriber Identification (IMSI), the Mobile Station Identifier (MSID) or the Mobile Identification Number (MIN), using possibly a plurality of different data streams.

It is also possible and preferred according to the present invention that both alternative variants are combined such that the telecommunications network comprises a first Online Charging System and a second Online Charging System and that a further telecommunications network comprises still a further Online Charging System (that could, e.g., be called a third Online Charging System).

The interworking credit control function is hereinafter also called Credit Control Proxy, as this interworking credit control function communicates with both the first Online Charging System, and the second Online Charging System (and possibly still further Online Charging Systems). The communication between the interworking credit control function and the first and second Online Charging Systems (or perhaps even more Online Charging Systems) is realized using an online charging interface, especially the Gy interface according to the 3GPP core network definitions, i.e. where the Gy interface (or Gy reference point), as an online charging interface, existing between the Online Charging System and the Policy and Charging Enforcement Function of a core network, the interworking credit control function having a first part of the online charging interface (i.e. a first online charging interface) with the Policy and Charging Enforcement Function (of the parent operator's network), a second part of the online charging interface (i.e. a second online charging interface) with the first Online Charging System (of the parent operator's network), and a third part of the online charging interface (i.e. a third online charging interface) with the second Online Charging System (of the parent operator's network in the first alternative variant of the present invention, or of a virtual network in the second alternative variant of the present invention).

According to the present, two simultaneous online charging sessions (or credit control streams) are permitted and established such that (at least) two different Online Charging Systems (e.g. the first Online Charging System of the parent operator's network and the second Online Charging System of the parent operator's network (first variant of the present invention) or of the virtual network (second variant of the present invention)) are involved regarding traffic, especially data traffic, that is related to one subscriber (or User Equipment) requesting data traffic services from the telecommunications network or from the telecommunications network and the further telecommunications network. In such a scenario according to the present invention, both involved Online Charging Systems have control over the traffic of the subscriber/User Equipment. This means that the (at least) two involved Online Charging Systems are symmetrically linked to (i.e. have an interface to) the interworking credit control function.

The interworking credit control function (or Credit Control proxy) is a separate function or method (possibly realized by an independent network node or network entity, or realized as a part of an existing network node or network entity) within the telecommunications network (i.e. the parent telecommunications network) that aggregates all credit control requests from various sources and presents a single interface towards the Policy and Charging Enforcement Function (usually located or implemented in the Gateway network entity or network node. In order to do that, the interworking credit control function utilizes, e.g., a standard DIAMETER based interface such as specified in RFC3588 and other 3GPP standards. However, it can support any other type of interface as well. The interworking credit control function (or Credit Control Proxy) has the following functions:

aggregating multiple credit control streams and presenting a single unified interface to the parent operators network;

making decisions on various credit control actions such as the quantum of quota to be granted, denial of quota etc. using a pre-defined logic;

separation of security domains in case the various credit control servers are in different networks;

adding or removing information, for example propietary information that is only used in the parent network.

According to the present invention, it is possible that the (at least) two simultaneous online charging sessions (or credit control streams) are coordinated by the interworking credit control function such that a coordination of (possibly different) initial quotas (or initial quota assignments, i.e. quota assignments related to the (at least) two online charging sessions) towards a unique quota is provided, the initial quotas or initial quota assignments being provided by the (at least two) Online Charging Systems, the unique quota being sent to the interworking credit control function.

By implementing the method and the telecommunications network according to the present invention (especially by receiving (initial) usage quotas from different entities (especially credit control servers or Online Charging Systems situated in the same or different networks), the (initial) usage quotas being applicable to the same service (such as data services requested especially from different operators and/or telecommunications networks) or partially overlapping services (such as, e.g., Voice over IP (VoIP) traffic and BitTorrent traffic controlled by, e.g., the (Online Charging System of the) Virtual Network Operator, and Peer to Peer (P2P) traffic controlled by, e.g., the (Online Charging System of the) parent operator), it is possible to avoid the drawbacks of the state of the art and provide at least the following advantages:

the method and corresponding telecommunications network according to the present invention allow the application of different policy decisions that apply to the same or overlapping traffic, and the method and corresponding telecommunications network according to the present invention allow network protection for subscribers that belong to a different entity than the operators network.

For example:

In case that the Virtual Network Operator (i.e. the operator of the further (or second) telecommunications network) is interested in controlling only the Internet usage for the purpose of service authorization, and the parent operator (i.e. the operator of the (first) telecommunications network) is interested in controlling the Internet traffic with the purpose of applying network protection, this means that when the volume usage surpasses certain limit, the Maximum Bit Rate is downgraded. The volume usage limits, defined in the Virtual Network Operator and in the parent operator, respectively, are different. The network entity or network node or network module corresponding to the interworking credit control function (or Credit Control Proxy) receives quotas from the Virtual Network Operator Online Charging System (i.e. the second Online Charging System) and from the parent network Online Charging System (i.e. the first Online Charging System). Towards the Policy and Charging Enforcement Function (i.e. normally towards the Gateway), the interworking credit control function (or Credit Control Proxy) determines the quota applicable according to predetermined rules that are defined by the operator. For example, one solution to be applied by the interworking credit control function is to apply the usage limits of the parent network instead the ones of the Virtual Network operator, or, more generally, to apply the lower usage limits if these differ.

In this example, the Credit Control Proxy performs the following transformations regarding the quotas allocated:

Input: Virtual Network Operator Quota for Internet, Parent Network Quota for Internet Output: Quota for Internet is equal to the Minimum of the Virtual Network Operator Quota for Internet and of the Parent Network Quota for Internet.

As another example (that can be combined with the first example), it is possible and preferred that the interworking credit control function (or Credit Control Proxy) performs the applicable transformations regarding the reported information from the Policy and Charging Enforcement Function (i.e. usually the Gateway). In this example, the transformation is comparably simple as the policy decisions apply to the same service, but with different usage limits.

Input: Volume used for Internet

Output: Towards Parent Network: Volume used for Internet; Towards Virtual Network Operator OCS: Volume used for Internet It is preferred according to the present invention, that the interworking credit control function receives a first message via the first online charging interface from the Policy and Charging Enforcement Function, the first message being at least one out of a Credit Control initiate Request message, a Credit Control update Request message, and a Credit Control terminate Request message, and wherein the interworking credit control function sends a second message, as a function of the first message, via the second online charging interface to the first Online Charging System and/or a third message, as a function of the first message, via the third online charging interface to the second Online Charging System, the second and/or third message being at least one out of
  a Credit Control initiate Request message,
  a Credit Control update Request message, and
  a Credit Control terminate Request message.

Thereby it is advantageously possible, to initiate, to regularly update and to terminate reports about the usage quota related to a subscriber of the telecommunications network and/or of the further telecommunications network. For example, by using the first, second and third message, a session can be established using a Credit Control initiate Request message as the first message (from the Policy and Charging Enforcement Function to the interworking credit control function) and as the second and third message (from the interworking credit control function to the first and second Online Charging System).

Furthermore, it is preferred according to the present invention that the interworking credit control function receives a fourth message via the second online charging interface from the first Online Charging System and/or a fifth message via the third online charging interface from the second Online Charging System, the fourth and/or fifth message being at least one out of
  a Credit Control initiate Answer message,
  a Credit Control update Answer message, and
  a Credit Control terminate Answer message, and
wherein the interworking credit control function sends a sixth message, as a function of the fourth and/or fifth message, via the first online charging interface to the Policy and Charging Enforcement Function, the sixth message being at least one out of
  a Credit Control initiate Answer message,
  a Credit Control update Answer message, and
  a Credit Control terminate Answer message.

Thereby it is advantageously possible, to initiate, to regularly update and to terminate reports about the usage quota related to a subscriber of the telecommunications network and/or of the further telecommunications network. For example, by using the fourth, fifth and sixth message, a feedback of a Credit Control initiate Request message can be provided using a Credit Control initiate Answer message as the fourth and fifth message (from the first and second Online Charging System to the interworking credit control function) and as the sixth message (from the interworking credit control function to the Policy and Charging Enforcement Function).

Still furthermore, it is preferred according to the present invention that the first to sixth messages are related to the User Equipment by way of a subscriber identifier, the subscriber identifier being at least one out of the following:
  the MSISDN (Mobile Subscriber Integrated Services Digital Network Number) of the User Equipment,
  the IMSI (International Mobile Subscriber Identification) of the User Equipment,
  the MSID (Mobile Station Identifier) of the User Equipment,
  the MIN (Mobile Identification Number) of the User Equipment.

Thereby, it is advantageously possible according to the present invention, that the relevant User Equipment can be clearly identified.

According to yet another embodiment of the present invention, it is preferred that the sixth message depends from the fourth and the fifth message such that in case of differing first and second usage limits communicated by the fourth message and by the fifth message, the sixth message comprises the lower usage limits of the first and second usage limits.

Furthermore, it is also preferred according to the present invention that the sixth message comprises a decision, applied by the interworking credit control function and based on a plurality of rules, the plurality of rules determining a plurality of credit control actions, especially regarding the quantum of quota to be granted and/or the denial of quota.

Furthermore, it is also preferred according to the present invention that
  the telecommunications network is a mobile communication system, especially a Public Land Mobile Network, and wherein the further telecommunications network is a virtual network using the telecommunications network, or that
  the telecommunications network is a WLAN communication system, and wherein the further telecommunications network is a virtual network using the telecommunications network.

The present invention also relates, according to a first alternative variant of the present invention, to a telecommunications network, especially a core network of a mobile communication networks, for enhanced policy and charging control, the telecommunications network being configured to be used by a User Equipment, the telecommunications network comprising a Policy and Charging Enforcement Function and a first Online Charging System, the Policy and Charging Enforcement Function and the first Online Charging System being configured to communicate via an online charging interface, the telecommunications network comprising a second Online Charging System being configured to communicate via an online charging interface,
wherein the telecommunications network further comprises an interworking credit control function, wherein the interworking credit control function is configured to communicate:
  via a first online charging interface, with the Policy and Charging Enforcement Function,
  via a second online charging interface, with the first Online Charging System, and
  via a third online charging interface, with the second Online Charging System.

Furthermore, the present invention also relates, according to a second alternative variant of the present invention, to a telecommunications network, especially a core network of a mobile communication networks, for enhanced policy and charging control, the telecommunications network being configured to be used by a User Equipment together with a further telecommunications network, the telecommunications network comprising a Policy and Charging Enforcement Function and a first Online Charging System, the Policy and Charging Enforcement Function and the first Online Charging System being configured to communicate via an online charging interface, the second telecommunications network comprising a second Online Charging System being configured to communicate via an online charging interface,
wherein the telecommunications network further comprises an interworking credit control function, wherein the interworking credit control function is configured to communicate:
  via a first online charging interface, with the Policy and Charging Enforcement Function,
  via a second online charging interface, with the first Online Charging System, and via a third online charging interface, with the second Online Charging System.

It is also possible and preferred according to the present invention that both alternative variants are combined such that the inventive telecommunications network comprises a first Online Charging System and a second Online Charging System and that a further telecommunications network comprises still a further Online Charging System (that could, e.g., be called a third Online Charging System).

Furthermore, the present invention relates to a program comprising program code which, when executed on a computer causes the computer to perform the inventive method, and to a computer program product for enhanced policy and charging control when a telecommunications network or a telecommunications network and a further telecommunications network is used by a User Equipment, the computer program product comprising a computer program stored on a storage medium, the computer program comprising program code which, when executed on a computer, causes the computer to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, the principle of the inventive method and telecommunications network is schematically illustrated. In the example shown in FIG. 1, the telecommunications network 10 corresponds to a mobile communication network, especially a General Packet Radio System (GPRS) network.

Such a telecommunications network 10 (or first telecommunications network 10) comprises an entity or a network node comprising or implementing the Policy and Charging Rules Function 13 and an entity or a network node comprising or implementing the Policy and Charging Enforcement Function 11. The Policy and Charging Rules Function 13 and the Policy and Charging Enforcement Function 11 are connected via a Gx interface. Furthermore, the telecommunications network 10 comprises a first Online Charging System 12, connected to the Policy and Charging Rules Function 13, e.g. via a SOAP protocol (Simple Object Access Protocol) interface or via a DIAMETER (authentication, authorization and accounting protocol for computer networks that is an alternative to RADIUS (Remote Authentication Dial In User Service)) based Sy reference point (or Sy interface) according to the 3GPP standard. The Policy and Charging Enforcement Function 11 and the Policy and Charging Rules Function 13 are both connected to a Subscriber Profile Repository function 13'. The Policy and Charging Enforcement Function 11 is typically located or integrated in a gateway node 11' (or network element or entity realizing a gateway functionality). In the case of a GPRS network, the gateway 11' corresponds to a Gateway GPRS Support Node. Of course, it is also possible according to the present invention that the Policy and Charging Enforcement Function 11 is located in a network entity separate from the gateway 11'.

The User Equipment 5 is connected to the telecommunications network 10 via a radio access network 18 which is connected via a SGSN (Serving GPRS Support Node) 17 to the gateway 11'. Furthermore, the gateway 11' is typically connected to the internet 19, especially via a Gi interface.

In the example represented in FIG. 1, a further (or second) telecommunications network 20 is provided, corresponding, e.g., to a so-called virtual telecommunications network. The further telecommunications network 20 comprises a second Online Charging System 22.

According to the present invention, an interworking credit control function 15 is provided between the Policy and Charging Enforcement Function 11, the first Online Charging System 12 and the second Online Charging System 22. The interface between the interworking credit control function 15 and the Policy and Charging Enforcement Function 11 corresponds to an online charging interface (especially a Gy interface) and is also called a first online charging interface 14. The interface between the interworking credit control function 15 and the first Online Charging System 12 corresponds to an online charging interface (especially a Gy interface) as well, and is also called a second online charging interface 16. The interface between the interworking credit control function 15 and the second Online Charging System 22 corresponds to an online charging interface (especially a Gy interface) as well, and is also called a third online charging interface 26.

The first Online Charging System 12 controls usage of, e.g., internet for the purpose of network control, whereas the second Online Charging System 22 controls usage of, e.g., internet independently of Quality of Service parameters such as the MBR (Maximum Bit Rate), the THP (Traffic Handling Priority) or the GBR (Guaranteed Bit Rate), assigned to the service for the purpose of service authorization. The interworking credit control function 15 performs a transformation of quota assigned by both the first Online Charging System 12 and the second Online Charging System 22 in the quota to be assigned to the gateway 11', and also the transformation of the usage reported from the gateway 11' into the RGs (Rating Groups) used in the first and second Online Charging System 12, 22.

Figure 2:
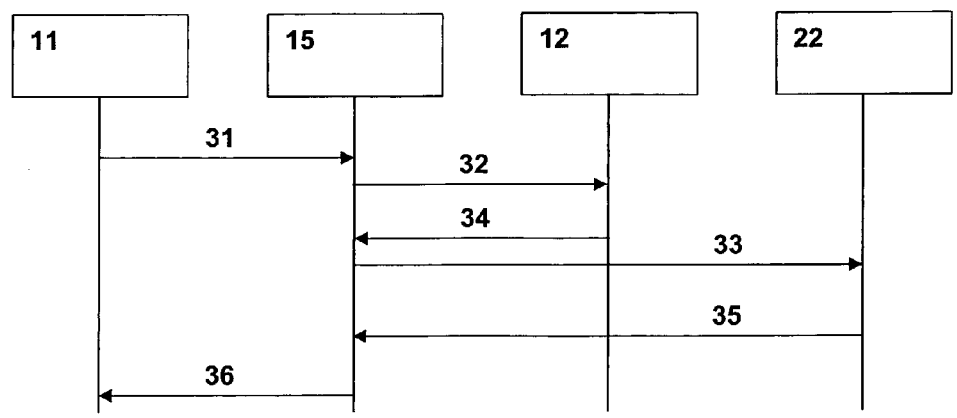
FIGS. 2 and 3 schematically illustrate message diagrams according to the present invention.

In FIG. 2, a message diagram according to the method according to the present invention is schematically shown. In a first step, a first message 31 is sent from the Policy and Charging Enforcement Function 11 (of the gateway 11') to the interworking credit control function 15. In a second step, a second message 32 is sent from the interworking credit control function 15 to the first Online Charging System 12. In a third step, a fourth message 34 is sent from the first Online Charging System 12 to the interworking credit control function 15. In a fourth step, a third message 33 is sent from the interworking credit control function 15 to the second Online Charging System 22. In a fifth step, a fifth message 35 is sent from the second Online Charging System 22 to the interworking credit control function 15. In a sixth step, a sixth message 36 is sent from the interworking credit control function 15 to the Policy and Charging Enforcement Function 11 (of the gateway 11').

The communication between the Policy and Charging Enforcement Function 11 (of the gateway 11'), the interworking credit control function 15, and the first as well as the second Online Charging System 12, 22 is typically composed of the first, second, third, fourth, fifth and sixth messages 31, 32, 33, 34, 35, 36. These messages can—during a policy and charging control session—be repeated a certain number of times, e.g. for updating purposes, for terminating purposes and the like. However, in order to establish a policy and charging control session, a session initiation communication is required using Credit Control initiate Request messages and Credit Control initiate Answer messages, as described in the following paragraph. A session update communication (using Credit Control update Request messages and Credit Control update Answer messages) can follow such a session initiation communication. Therefore, when in the following the term "first message" or "second message" etc. (or "preliminary step") is used with respect to the update communication and/or with respect to the termination communication and/or with respect to the re-authorization communication, it should be understood that this terminology does not refer to the policy and charging control session as a whole but to the specified part thereof such as the update communication and/or the termination communication and/or the re-authorization communication. The options after the initiation of the policy and charging control session are as follows:

a session update of the policy and charging control session, by way of the Policy and Charging Enforcement Function 11 (of the gateway 11') sending a Credit Control update Request message to the interworking credit control function 15;

a session re-authorization of the policy and charging control session, by way of the first Online Charging System 12 sending a Re-Authorization request to the interworking credit control function 15;

a session termination of the policy and charging control session, by way of the Policy and Charging Enforcement Function 11 (of the gateway 11') sending a Credit Control terminate Request message to the interworking credit control function 15.

For the purpose of a session establishment of a policy and charging control session, the Policy and Charging Enforcement Function 11 (of the gateway 11') sends a Credit Control initiate Request message (as the first message 31 of this example) to the interworking credit control function 15, using, e.g., the MSISDN as a parameter to identify the subscriber 5 and requesting a quota. The interworking credit control function 15 sends a Credit Control initiate Request message (as the second message 32 of this example) to the first Online Charging System 12 using the same parameters as in the first message 31 of this example. The first Online Charging System 12 replies with a Credit Control initiate Answer message (as the fourth message 34 of this example), granting quota to the interworking credit control function 15. Furthermore the interworking credit control function 15 sends a Credit Control initiate Request message (as a third message 33 of this example) to the second Online Charging System 22 (also using, e.g., the MSISDN as a parameter to identify the subscriber 5 and requesting a quota). The second Online Charging System 22 replies by way of a Credit Control initiate Answer message (as a fifth message 35 of this example), also granting quota to the interworking credit control function 15. The interworking credit control function 15 takes the two answers from the two Online Charging Systems 12, 22, i.e. the assigned quotas from the first and second Online Charging System 12, 22, into consideration, and sends (as the sixth message 36 of this example) a Credit Control initiate Answer message to the Policy and Charging Enforcement Function 11 (of the gateway 11'). In the example where a different quota of internet usage is allocated, e.g. the minimum allocated quota is communicated to the Policy and Charging Enforcement Function 11 in the sixth message 36. For other cases, the interworking credit control function 11 is configurable to apply different rules or transformations.

For the purpose of a session update of a policy and charging control session, the Policy and Charging Enforcement Function 11 (of the gateway 11') sends a Credit Control update Request message (as the first message 31 of this example) to the interworking credit control function 15, using, e.g., the MSISDN as a parameter to identify the subscriber or User Equipment 5 and requesting a quota and reporting on consumed data volume. The interworking credit control function 15 sends a Credit Control update Request message (as the second message 32 of this example) to the first Online Charging System 12 using the same parameters as in the first message 31 of this example. The first Online Charging System 12 replies with a Credit Control update answer message (as the fourth message 34 of this example), granting quota to the interworking credit control function 15. Furthermore the interworking credit control function 15 sends a Credit Control update Request message (as a third message 33 of this example) to the second Online Charging System 22 (also using the MSISDN as the parameter to identify the subscriber or User Equipment 5 and requesting a quota and reporting on used data volume). The second Online Charging System 22 replies by way of a Credit Control update answer message (as a fifth message 35 of this example), also granting quota to the interworking credit control function 15. The interworking credit control function 15 takes the two answers from the two Online Charging Systems 12, 22, i.e. the assigned quotas from the first and second Online Charging System 12, 22, into consideration, and sends (as the sixth message 36 of this example) a Credit Control update Answer message to the Policy and Charging Enforcement Function 11 (of the gateway 11').

For the purpose of a session termination of a policy and charging control session, the Policy and Charging Enforcement Function 11 (of the gateway 11') sends a Credit Control terminate Request message (as the first message 31 of this example) to the interworking credit control function 15, reporting on final used data volume for the session. The interworking credit control function 15 sends a Credit Control terminate Request message (as the second message 32 of this example) to the first Online Charging System 12 using the same parameters as in the first message 31 of this example. The first Online Charging System 12 replies with a Credit Control terminate Answer message (as the fourth message 34 of this example). Furthermore the interworking credit control function 15 sends a Credit Control terminate Request message (as a third message 33 of this example) to the second Online Charging System 22 (also using the MSISDN as the parameter to identify the subscriber or User Equipment 5). The second Online Charging System 22 replies by way of a Credit Control terminate Answer message (as a fifth message 35 of this example), also reporting on used data volume. The interworking credit control function 15 sends (as the sixth message 36 of this example) a Credit Control terminate Answer message to the Policy and Charging Enforcement Function 11 (of the gateway 11').

In case of a credit expiry in mid session, the following update scenario applies: The Policy and Charging Enforcement Function 11 (of the gateway 11') sends a Credit Control update Request message (as the first message 31 of this example) to the interworking credit control function 15, requesting a quota and reporting on consumed data volume. The interworking credit control function 15 sends a Credit Control update Request message (as the second message 32 of this example) to the first Online Charging System 12 using the same parameters as in the first message 31 of this example. The first Online Charging System 12 determines that the volume limit for a certain Quality of Service parameter (e.g high MBR (Maximum Bit Rate) traffic) has been reached and sends a request towards the Policy and Charging Rules Function 13 to initiate the downgrade of that Quality of Service parameter. The first Online Charging System 12 then replies with a Credit Control update Answer message (as the fourth message 34 of this example), indicating that in this case no quota is grated to the interworking credit control function 15 (quota=0). Furthermore the interworking credit control function 15 sends a Credit Control update Request message (as a third message 33 of this example) to the second Online Charging System 22 (also using the MSISDN as the parameter to identify the subscriber or User Equipment 5 and requesting a quota and reporting on used data volume). The second Online Charging System 22 replies by way of a Credit Control update Answer message (as a fifth message 35 of this example), granting quota to the interworking credit control function 15. The interworking credit control function 15 takes the two answers from the two Online Charging Systems 12, 22, i.e. the assigned quotas from the first and second Online Charging System 12, 22, into consideration, and sends (as the sixth message 36 of this example) a Credit Control update Answer message to the Policy and Charging Enforcement Function 11 (of the gateway 11'), e.g. the quota granted by the second Online Charging System 22.

Figure 3:
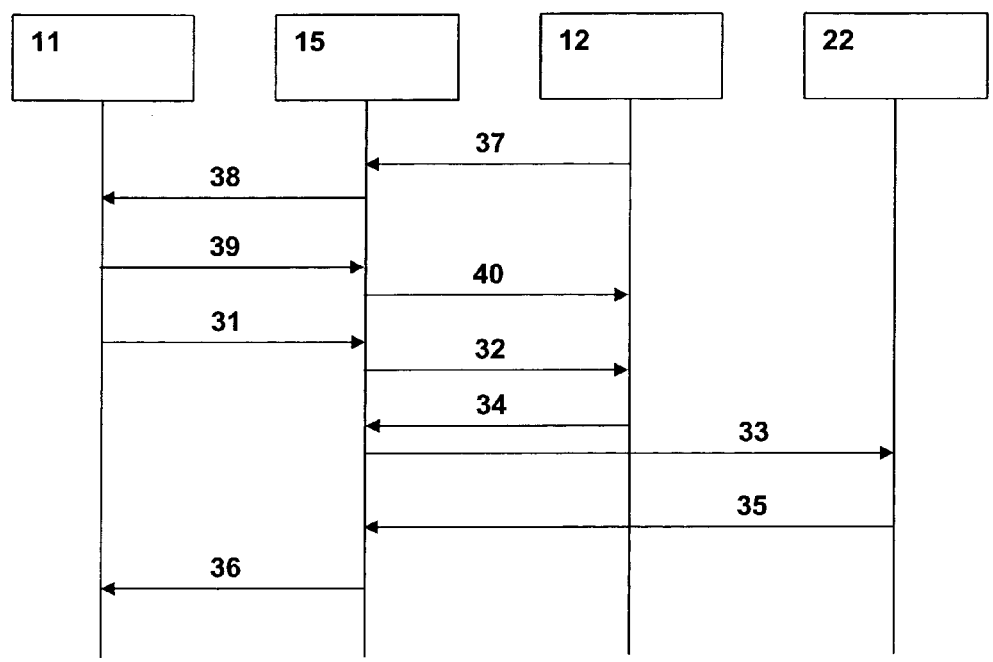

In FIG. 3, a message diagram according to the method according to the present invention is schematically shown for the case of a re-authorization request triggered by the first Online Charging System 12. In a preliminary step (prior to the first step, i.e. sending the first message 31 in the form of a Credit Control update Request message from the Policy and Charging Enforcement Function 11 (of the gateway 11') to the interworking credit control function 15), the following sub-steps occur:

in a first sub-step, a seventh message 37 is sent from the first Online Charging System 12 to the interworking credit control function 15, the seventh message being a Re-Authorization request;

in a second sub-step, the Re-Authorization request of the first sub-step is forwarded to the Policy and Charging Rules Function 11 (of the gateway 11'), i.e. an eighth message 38 is sent from the interworking credit control function 15 to the Policy and Charging Rules Function 11 (of the gateway 11'), the eighth message 38 being a Re-Authorization request;

in a third sub-step, the Policy and Charging Rules Function 11 (of the gateway 11') confirms the reception of the Re-Authorization request by way of a Re-Authorization answer represented in FIG. 3 by way of a ninth message 39 from the Policy and Charging Rules Function 11 to the interworking credit control function 15;

in a fourth sub-step, the Re-Authorization answer of the third sub-step is forwarded to the second Online Charging System 12, i.e. a tenth message 40 is sent from the interworking credit control function 15 to the second Online Charging System 12, the tenth message 40 being a Re-Authorization answer.

After the preliminary step, the session update of the policy and charging control session is performed as indicated above.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced policy and charging control when a telecommunications network is used by a User Equipment corresponding to a subscriber, wherein the telecommunications network comprises a Policy and Charging Enforcement Function, a first Online Charging System, and a second Online Charging System, the method comprising:

communicating, by an interworking credit control function of the telecommunications network, with regard to the same or overlapping traffic of the subscriber, via a first online charging interface with the Policy and Charging Enforcement Function, via a second online charging interface with the first Online Charging System, and via a third online charging interface with the second Online Charging System;

wherein the communicating includes communicating with the first Online Charging System regarding a network usage quota granted by the first Online Charging System, communicating with the second Online Charging System regarding a network usage quota granted by the second Online Charging System, and communicating with the Policy and Charging Enforcement Function with regard to an allocated quota based on the network usage quotas granted by the first and second Online Charging Systems.

2. The method according to claim 1, wherein the interworking credit control function receives a first message via the first online charging interface from the Policy and Charging Enforcement Function, the first message being at least one of the group consisting of: a Credit Control initiate Request message; a Credit Control update Request message, and a Credit Control terminate Request message; and wherein the interworking credit control function sends a second message, as a function of the first message, via the second online charging interface to the first Online Charging System and/or a third message, as a function of the first message, via the third online charging interface to the second Online Charging System, the second and/or third message being at least one out of the group consisting of: a Credit Control initiate Request message; a Credit Control update Request message; and a Credit Control terminate Request message.

3. The method according to claim 2, wherein the interworking credit control function receives a fourth message via the second online charging interface from the first Online Charging System and/or a fifth message via the third online charging interface from the second Online Charging System, the fourth and/or fifth message being at least one out of the group consisting of: a Credit Control initiate Answer message; a Credit Control update Answer message; and a Credit Control terminate Answer message; and wherein the interworking credit control function sends a sixth message, as a function of the fourth and/or fifth message via the first online charging interface to the Policy and Charging Enforcement Function, the sixth message being at least one out of the group consisting of: a Credit Control initiate Answer message; a Credit Control update Answer message; and a Credit Control terminate Answer message.

4. The method according to claim 3, wherein the first to sixth messages are related to the User Equipment by way of a subscriber identifier, the subscriber identifier being at least one out of the group consisting of:
a Mobile Subscriber Integrated Services Digital Network Number (MSISDN) of the User Equipment;
an International Mobile Subscriber Identification (IMSI) of the User Equipment;
a Mobile Station Identifier (MSID) of the User Equipment; and
a Mobile Identification Number (MIN) of the User Equipment.

5. The method according to claim 3, wherein the sixth message depends from the fourth and the fifth messages such that in case of differing first and second usage limits communicated by the fourth and fifth messages, the sixth message comprises the lower usage limits of the first and second usage limits.

6. The method according to claim 3, wherein the sixth message comprises a decision, applied by the interworking credit control function and based on a plurality of rules, the plurality of rules determining a plurality of credit control actions regarding the quantum of quota to be granted and/or the denial of quota.

7. A method for enhanced policy and charging control when a telecommunications network and a further telecommunications network is used by a User Equipment corresponding to a subscriber of the telecommunications network and/or of the further telecommunications network, wherein the telecommunications network comprises a Policy and Charging Enforcement Function and a first Online Charging System, wherein the further telecommunications network comprises a second Online Charging System, the method comprising:

communicating, by an interworking credit control function of the telecommunications network, with regard to the same or overlapping traffic of the subscriber, via a first online charging interface with the Policy and Charging Enforcement Function, via a second online charging interface with the first Online Charging System, and via a third online charging interface with the second Online Charging System;

wherein the communicating includes communicating with the first Online Charging System regarding a network usage quota granted by the first Online Charging System, communicating with the second Online Charging System regarding a network usage quota granted by the second Online Charging System, and communicating with the Policy and Charging Enforcement Function with regard to an allocated quota based on the network usage quotas granted by the first and second Online Charging Systems.

8. The method according to claim 7, wherein the interworking credit control function receives a first message via the first online charging interface from the Policy and Charging Enforcement Function, the first message being at least one of the group consisting of: a Credit Control initiate Request message; a Credit Control update Request message, and a Credit Control terminate Request message; and wherein the interworking credit control function sends a second message, as a function of the first message, via the second online charging interface to the first Online Charging System and/or a third message, as a function of the first message, via the third online charging interface to the second Online Charging System, the second and/or third message being at least one out of the group consisting of: a Credit Control initiate Request message; a Credit Control update Request message; and a Credit Control terminate Request message.

9. The method according to claim 8, wherein the interworking credit control function receives a fourth message via the second online charging interface from the first Online Charging System and/or a fifth message via the third online charging interface from the second Online Charging System, the fourth and/or fifth message being at least one out of the group consisting of: a Credit Control initiate Answer message; a Credit Control update Answer message; and a Credit Control terminate Answer message; and wherein the interworking credit control function sends a sixth message, as a function of the fourth and/or fifth message via the first online charging interface to the Policy and Charging Enforcement Function, the sixth message being at least one out of the group consisting of: a Credit Control initiate Answer message; a Credit Control update Answer message; and a Credit Control terminate Answer message.

10. The method according to claim 9, wherein the first to sixth messages are related to the User Equipment by way of a subscriber identifier, the subscriber identifier being at least one out of the group consisting of:
a Mobile Subscriber Integrated Services Digital Network Number (MSISDN) of the User Equipment;
an International Mobile Subscriber Identification (IMSI) of the User Equipment;
a Mobile Station Identifier (MSID) of the User Equipment; and
a Mobile Identification Number (MIN) of the User Equipment.

11. The method according to claim 9, wherein the sixth message depends from the fourth and the fifth messages such that in case of differing first and second usage limits communicated by the fourth and fifth messages, the sixth message comprises the lower usage limits of the first and second usage limits.

12. The method according to claim 9, wherein the sixth message comprises a decision, applied by the interworking credit control function and based on a plurality of rules, the plurality of rules determining a plurality of credit control actions regarding the quantum of quota to be granted and/or the denial of quota.

13. The method according to claim 7, wherein the telecommunications network is a Public Land Mobile Network, and wherein the further telecommunications network is a virtual network using the telecommunications network.

14. The method according to claim 7, wherein the telecommunications network is a Wireless Local Area Network (WLAN) communication system, and wherein the further telecommunications network is a virtual network using the telecommunications network.

15. A telecommunications network, wherein the telecommunications network is a core network of a mobile communication network, for enhanced policy and charging control, the telecommunications network being configured to be used by a User Equipment corresponding to a subscriber, the telecommunications network comprising:
   a Policy and Charging Enforcement Function;
   a first Online Charging System;
   a second Online Charging System; and
   an interworking credit control function;
   wherein the interworking credit control function is configured to communicate, with regard to the same or overlapping traffic of the subscriber, via a first online charging interface with the Policy and Charging Enforcement Function, via a second online charging interface with the first Online Charging System, and via a third online charging interface with the second Online Charging System;
   wherein the communications includes communication with the first Online Charging System regarding a network usage quota granted by the first Online Charging System, communication with the second Online Charging System regarding a network usage quota granted by the second Online Charging System, and communication with the Policy and Charging Enforcement Function with regard to an allocated quota based on the network usage quotas granted by the first and second Online Charging Systems.

16. A system comprising:
   a telecommunications network; and
   a further telecommunications network;
   wherein the telecommunications network is a core network of a mobile communication network, for enhanced policy and charging control;
   wherein the telecommunications network is configured to be used by a User Equipment together with the further telecommunications network, the User Equipment corresponding to a subscriber of the telecommunications network and/or of the further telecommunications network;
   wherein the telecommunications network comprises:
      a Policy and Charging Enforcement Function;
      a first Online Charging System; and
      an interworking credit control function;
   wherein the further telecommunications network comprises:
      a second Online Charging System;
   wherein the interworking credit control function is configured to communicate, with regard to the same or overlapping traffic of the subscriber, via a first online charging interface with the Policy and Charging Enforcement Function, via a second online charging interface with the first Online Charging System, and via a third online charging interface with the second Online Charging System;
   wherein the communications includes communication with the first Online Charging System regarding a network usage quota granted by the first Online Charging System, communication with the second Online Charging System regarding a network usage quota granted by the second Online Charging System, and communication with the Policy and Charging Enforcement Function with regard to an allocated quota based on the network usage quotas granted by the first and second Online Charging Systems.

17. The telecommunications network of claim 16, wherein the telecommunications network is a Public Land Mobile Network and the further telecommunications network is a virtual network using the telecommunications network.

18. The telecommunications network of claim 16, wherein the telecommunications network is a Wireless Local Area Network (WLAN) communication system, and wherein the further telecommunications network is a virtual network using the telecommunications network.

19. A non-transitory processor-readable medium having processor-executable instructions stored thereon for enhanced policy and charging control when a telecommunications network is used by a User Equipment corresponding to a subscriber, wherein the telecommunications network comprises a Policy and Charging Enforcement Function, a first Online Charging System, and a second Online Charging System, the processor-executable instructions, when executed by a processor, causing the following to be performed:
   communicating, by an interworking credit control function of the telecommunications network, with regard to the same or overlapping traffic of the subscriber, via a first online charging interface with the Policy and Charging Enforcement Function, via a second online charging interface with the first Online Charging System, and via a third online charging interface with the second Online Charging System;
   wherein the communicating includes communicating with the first Online Charging System regarding a network usage quota granted by the first Online Charging System, communicating with the second Online Charging System regarding a network usage quota granted by the second Online Charging System, and communicating with the Policy and Charging Enforcement Function with regard to an allocated quota based on the network usage quotas granted by the first and second Online Charging Systems.

20. A non-transitory processor-readable medium having processor-executable instructions stored thereon for enhanced policy and charging control when a telecommunications network and a further telecommunications network is used by a User Equipment corresponding to a subscriber of the telecommunications network and/or of the further telecommunications network, wherein the telecommunications network comprises a Policy and Charging Enforcement Function and a first Online Charging System; wherein the further telecommunications network comprises a second Online Charging System, the processor-executable instructions, when executed by a processor, causing the following to be performed:

communicating, by an interworking credit control function of the telecommunications network, with regard to the same or overlapping traffic of the subscriber, via a first online charging interface with the Policy and Charging Enforcement Function, via a second online charging interface with the first Online Charging System, and via a third online charging interface with the second Online Charging System;

wherein the communicating includes communicating with the first Online Charging System regarding a network usage quota granted by the first Online Charging System, communicating with the second Online Charging System regarding a network usage quota granted by the second Online Charging System, and communicating with the Policy and Charging Enforcement Function with regard to an allocated quota based on the network usage quotas granted by the first and second Online Charging Systems.

\* \* \* \* \*